May 26, 1964   J. A. ATWOOD   3,134,111
RETRACTABLE WHEEL SUPPORT
Filed Sept. 16, 1960   2 Sheets-Sheet 1
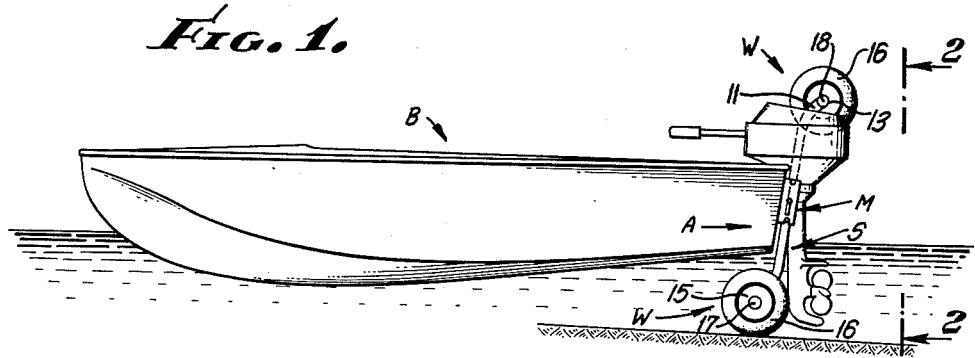
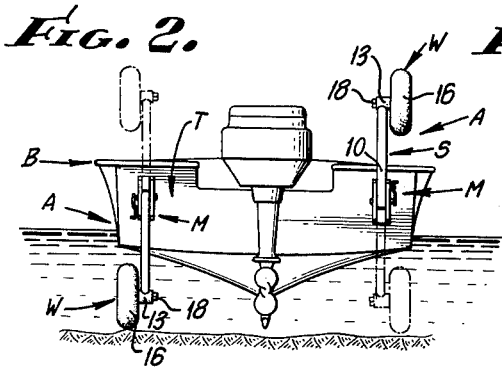
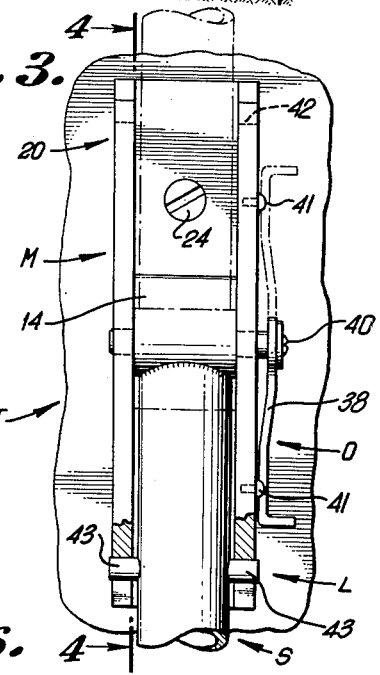
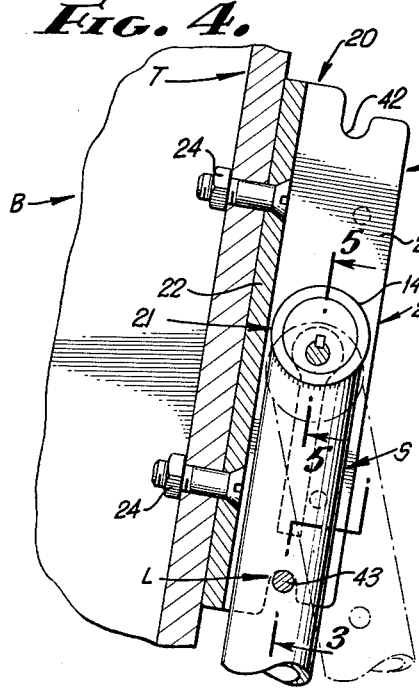
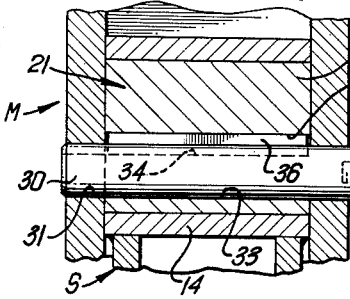
INVENTOR.
JOHN A. ATWOOD
BY
*[signature]*
AGENT.

May 26, 1964  J. A. ATWOOD  3,134,111
RETRACTABLE WHEEL SUPPORT
Filed Sept. 16, 1960                                    2 Sheets-Sheet 2
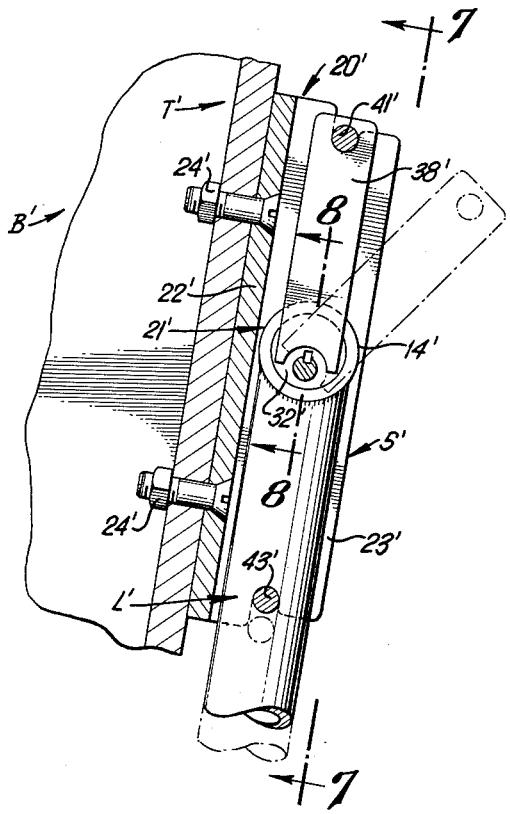
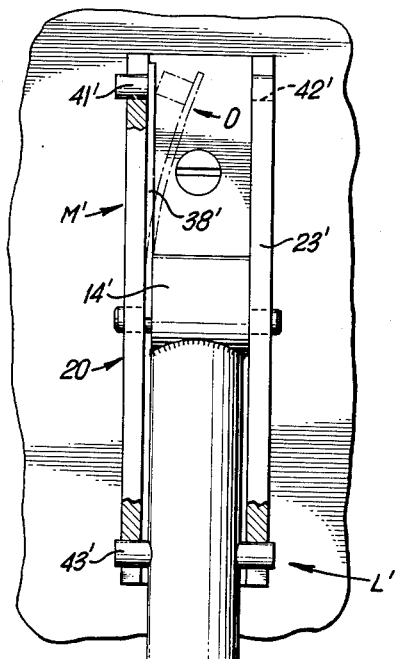
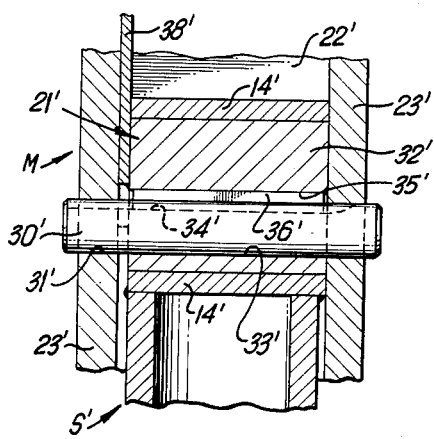
INVENTOR.
JOHN A. ATWOOD
BY
AGENT.

3,134,111
RETRACTABLE WHEEL SUPPORT
John Alden Atwood, Burbank, Calif.
(11629 Vanowen, North Hollywood, Calif.)
Filed Sept. 16, 1960, Ser. No. 56,481
15 Claims. (Cl. 9—1)

This invention has to do with a retractable wheel construction and is more particularly concerned with a wheel construction applicable to small water craft to facilitate launching such craft from the shore.

It is common practice to transport small boats across land and to the shore of bodies of water on trailer, or on the tops of automobiles. Upon reaching the body of water where the craft is to be used, it yet remains to launch the craft, that is, to move it from the car or trailer across the shore and into the water. The ordinary craft is too heavy and/or awkward to carry to the water and it is extremely undesirable to slide the craft across the shore, which is frequently covered with rocks and other like obstructions which will damage the bottom of the craft. Accordingly, it is common practice to provide especially made trailers or dollies that can be rolled into the water to launch the craft. Such trailers, or dollies are, however, heavy, costly units which are themselves a problem to handle and care for. Furthermore, such trailers and dollies are such that they cannot be carried by the boat or craft and so that the craft can be conveniently taken from or out of the water, except at the launching site.

Many attempts have been made to provide suitable retractable wheel constructions for small light boats. Such attempts have met with varying success, but each has resulted in a heavy, cumbersome means and a means which requires the craft to which it is related to be especially constructed of modified and heavily reinforced material.

An object of the present invention is to provide a novel retractable wheel construction applicable to a small boat, which construction is light in weight neat, compact and easy and convenient to operate.

A further object of my invention is to provide a retractable wheel construction that can be advantageously applied to the transom of any conventional boat and which is such that the wheel can be easily and conveniently shifted from a down position where it occurs beneath the rear portion of the boat to an up position where it occurs above the water line of the boat and rearward of the transom and where it is out of the way of passengers and trails the boat in such a manner that it is not subject to interfering with the forward progress of the boat.

Still another object of my invention is to provide a pair of retractable wheel constructions of the character referred to arranged in lateral spaced relationship on the transom of the boat to which they are related and at the opposite sides of an outboard motor mounted centrally on the transom and so that when they are in their down position, they provide stable, rolling support for the boat and so that they serve as guards or protectors for the submerged portion of the outboard motor when the boat is launched and operated in shallow waters. The wheels are also serviceable as drags, when in their down position, to make it possible to operate the boat at low speeds, as when trolling for fish and yet maintain sufficient motor speeds to keep the motor operating and sufficent propelling thrust to assure adequate handling and maneuvering of the boat.

Another object is to provide a pair of wheels as set forth above, which project above and rearward of the outboard motor when they are in their up position so that they serve as protective bumpers for the motor.

It is still another object of my invention to provide a retractable wheel construction of the character referred to including, a wheel, an elongate leg, means rotatably supporting the wheel at one end of the leg and mounting means for pivotally securing the other end of the leg to the transom of a boat.

An object of my invention is to provide a novel pivotal mounting means for a supporting leg or strut including cam operated locking means operable to positively lock and to provide support for the leg in two selective positions.

It is an object of this invention to provide means for storing the boat, other than lifting it up on harnesses and the like. When the wheels are in the down position, the boat can be stored in an upright condition and held clear of the deck or ground by the wheels. When the wheels are in the up position, the boat can be stored in an inverted condition (which is common practice), the stern being maintained spaced above the deck and the bow making point contact with the deck, or elevated above the deck by a block or box. The boat thus stored can be easily and conveniently moved from one place to another as circumstances require.

Another object is to provide a mounting means of the character referred to which is easy and economical to manufacture, and which is easy and convenient to operate and which is highly effective and dependable in operation.

The various objects and features of my invention will be fully understood from the following detailed description of typical preferred forms and applications of my invention, throughout which description reference is made to the accompanying drawings, in which:

FIG. 1 is a side elevational view of a boat with the retractable wheel supports that I provide related thereto, showing one wheel in an up position and the other in the down position.

FIG. 2 is a rear view of the structure shown in FIG. 1, taken as indicated by line 2—2 on FIG 1.

FIG. 3 is an enlarged view of a portion of the structure shown in FIG. 2, showing details of the mounting means.

FIG. 4 is a detailed view taken as indicated by line 4—4 on FIG. 3.

FIG. 5 is a detailed sectional view taken as indicated by line 5—5 on FIG. 4.

FIG. 6 is a view similar to FIG. 3 and showing a modified form of the invention.

FIG. 7 is a view taken as indicated by line 7—7 on FIG. 6.

FIG. 8 is a view taken as indicated by line 8—8 on FIG. 7.

The retractable wheel supports A provided by the present invention are adapted to be engaged and supported on the transom T of a boat B.

Each support A is shown as including generally, an elongate leg or strut S, mounting means M pivotally securing one end of the strut to the transom T of the boat B and a wheel W rotatably carried by the other end of the strut.

The strut S is a simple, elongate, tubular member having a substantially straight, inner portion 10 and a curved, outer portion 11. The outer portion is curved to extend forwardly when the strut projects downwardly from the mounting means M and project rearwardly when the strut projects upwardly from the mounting means.

The outer end of the strut is provided with a bearing sleeve 13 to receive an axle member on the wheel W. The sleeve 13 extends horizontally and transversely of the strut and is secured thereto as by welding and in such a manner as to seal the outer end of the strut.

The inner end of the strut S is provided with a bearing sleeve 14 to receive a supporting shaft of the mounting means M. The sleeve 13 extends horizontally and transversely of the strut and is secured thereto as by welding and so that the inner end of the strut is closed and sealed by the sleeve 14.

The sleeve 14 corresponds in longitudinal extent with the diameter of the strut.

The wheel W is a simple, conventional unit having a disc-shaped body 15, a pneumatic tire 16 carried by the body and a central axle member 17.

The axle member 17 projects from one side of the wheel and projects through the bearing sleeve 13 on the outer end of the strut S and is retained thereon by a suitable nut 18.

The mounting means M that I provide includes an elongate, substantially vertically disposed carrier 20, a crank 21 rotatably supported by the carrier and engaged through the bearing sleeve 14 in the strut S, lock means L and operating means O.

The carrier 20 is U-shaped in cross-section, having a flat vertically disposed front wall 22, flat, vertically disposed laterally spaced side walls 23 projecting rearwardly from the front wall.

The side walls are spaced apart a distance sufficient to slidably receive the inner end portion of the strut S and the bearing sleeve 14 thereon.

The front wall 22 of the carrier is adapted to establish flat bearing engagement on the transom T of the boat B and is secured thereto by suitable screw fasteners 24, as clearly illustrated in FIG. 4 of the drawings.

The crank 21 includes an elongate shaft 30 engaged through registering openings 31 in the side walls of the carrier, intermediate the ends thereof on a central cylindrical lobe or bearing 32 on the shaft to occur between the side walls of the carrier and rotatably engaged in the bearing sleeve 14 on the inner end of the strut.

The lobe or bearing 32 is provided with a longitudinal opening 33 through which the shaft 30 extends.

The shaft 30 and lobe or bearing 32 are provided with opposing longitudinal keyways 34 and 35 in which a suitable key 36 is engaged to assure driving engagement between the shaft and the lobe.

The opening 35 in the lobe is radially offset from and extends parallel with the central axis of the lobe. With this relationship of parts, it will be apparent that when the lobe is rotated through 180° to and from positions where the central axis of the lobe is positioned above and below the pivotal axis of the shaft 30, the strut S, which is pivotally carried by the lobe, is shifted up or down.

The operating means O is shown as including a polygonal extension 37 on one end of the shaft 30, an elongate operating lever 38 having one and provided with a polygonal opening 39 to cooperatively receive the extension 37, a retaining screw 40 engaged in the extension from the outer end thereof and holding the level engaged on the extension and a pair of vertically spaced button-like projections or stops 41 on the adjacent side wall of the carrier, above and below the shaft 30 and adapted to engage the lever and normally prevent the lever and crank means related thereto from shifting freely.

As shown, the lever is formed so as to occur in a plane which stops 41 intersect and is such that it can be normally sprung to and urged passed the stops as circumstances require.

The lock means L that I provide, is shown as including longitudinally outwardly opening notches 42 in the ends of the side walls 23 of the carrier 20 and laterally outwardly projecting pins 43 on the strut and positioned so that when the strut extends parallel with the axis of the carrier and extends from the same side of the pivotal axis of the lobe that the central axis of the lobe occurs, the pins are spaced longitudinally outward of the notches 42 and the strut is free to be rotated, and so that when the strut extends or projects from the opposite side of the pivotal axis of the lobe from the side thereof at which the central axis of the lobe occurs, the pins engage in the notches and the strut is locked against rotation about the lobe and relative to the carrier.

With the above relationship of parts, it will be apparent that by manually rotating the lobe of the crank means, by means of the lever of the operating means, the strut can be shifted longitudinally relative to the carrier to shift the pins 43 of the locking means into and out of locked engagement in the notches 42 in the ends of the carrier.

When it is desired to shift the strut from a down, locked position, such as is shown on the left side of FIG. 2 of the drawings, to an up, locked position, as shown at the right side of the same figure of the drawings, the crank means is manually shifted to disengage the pins 43 from the notches 42 in the lower end of the carrier, by the operating means O. The strut S, with the wheel W, is then manually pivoted about the crank means to its up position, whereupon the crank means is again operated by the means O to shift the pins into locked engagement in the notches 42 in the upper end of the carrier.

It will be apparent that the strut S is suitably held and supported against lateral forces by the side walls of the carrier when in either of its locked positions.

In the preferred carrying out of the invention and as illustrated in FIGS. 1 and 2 of the drawings, the boat B is provided with a pair of wheel supports A secured to the transom T of the boat in lateral spaced relationship. With this relationship of parts, it will be apparent that when the supports are down and engaged with the bottom of the body of water or the shore, they provide stable support for the boat.

Further and as clearly illustrated in FIGS. 1 and 2 of the drawings, the pair of supports are spaced to occur at the opposite sides of an outboard motor M mounted centrally on the transom T and so as to act as shields or protectors at the sides of the motor. Still further, the struts are, as shown, of sufficient longitudinal extent and the outer ends thereof are sufficiently curved so that when the supports are in their down position, the wheels occur beneath the rear end portion of the boat, forward of the lower end portion of the outboard motor and so that the lowermost portions of the wheel occur below the lowermost portion of the motor. With this relationship of parts, the supports serve as submerged bumpers to protect the submerged portion of the motor when the boat is operated in shallow waters. Also, the wheels occurring forward of the motor and beneath the rear end portion of the boat B, they occur close to the center of gravity of the boat and motor assembly and materially reduce the effort required to manually lift the front end of the boat, as when it is being launched or removed from the water.

It is also to be noted that the struts are shaped and proportioned so that when the supports are in their up position, the uppermost portions of the wheel occur in a horizontal plane spaced above the uppermost portion of the motor M and so that the rearmost portions of the wheels occur in a vertical plane spaced rearward of the rearmost portion of the motor.

With this relationship of parts, it will be apparent that when the wheels are up, they serve as protective bumpers for the top, side and rear of the motor. This is highly desirable when operating the boat about or mooring the boat at a pier, or the like, or where it is apt to come into contact with other boats or marine equipment and facilities.

In FIGS. 6, 7, and 8 of the drawings, I have shown a modified form of operating means O'.

The means O' is shown as including an elongate, flexible operating lever 38' formed of a length of strap spring steel and having one end secured to one end of the lobe 32' and having an axially or laterally outwardly projecting stop pin 41' at its outer end. The lever 38' projects radially from the lobe 32' to normally occur in flat bearing engagement with the inner surface of the adjacent side wall 23' of the carrier 20' and with the stop pin 41' projecting into and through the switch 42' provided in the related end of the said adjacent side wall.

With the above form of operating means, it will be apparent that when it is desired to rotate the lobe so as to disengage the pins 43' on the leg from the notches 42' in which they are engaged, the operator can engage the stop pin 41', urge it laterally inwardly, out of engagement in the notch 42' in which it is engaged, against the resistance of the resilient lever 38'. When the pin 41' is thus disengaged, the lever 38' can be conveniently shifted or swung to rotate the lobe as desired.

In all other respects, this modified form of the invention is the same as the preceding form.

The second form of the invention has the advantage of arranging the lever within the carrier 20', where it is protected and also utilizes the notches 42' at the ends of the carrier to lock the lever in position, as distinguished from providing special stop means on the carrier for the lever, as in the first embodiment of the invention.

While the particular retractable wheel support construction that I provide is intended for use in connection with a boat, as shown, it is to be understood that it is not limited to such use, that is, it could, if desired, be used on or in connection with any other object which one might wish to make portable or movable.

Having described only typical preferred forms and applications of my invention, I do not wish to be limited or restricted to the specific details herein set forth, but wish to reserve to myself any modifications or variations that may appear to those skilled in the art and fall within the scope of the following claims:

Having described my invention, I claim:

1. A retractable support including, an elongate, vertically disposed carrier, a shaft rotatably supported by the carrier intermediate its ends, a cylindrical lobe on the shaft, the central axis of the lobe being laterally offset from the axis of the shaft, an elongate strut having a bearing sleeve at one end rotatably receiving the lobe, a pin projecting from the strut at a point spaced from the bearing sleeve, a longitudinally outwardly opening pin receiving notch at each end of the carrier, said strut being shiftable from a down position where it projects downwardly from the carrier to an up position where it projects upwardly from the carrier, said pin being shiftable into and out of locked engagement with the notch in one or the other end of the carrier by rotation of the shaft and lobe and resulting axial shifting of the strut relative to the carrier when the strut is in either its up or down position.

2. A retractable wheel support including, an elongate, vertically disposed carrier with laterally spaced side walls, an elongate shaft extending between and rotatably carried by the side walls intermediate the ends thereof, an operating lever fixed to one end of the shaft to rotate the shaft relative to the carrier, a cylindrical lobe carried by the shaft between the side walls of the carrier with its central axis offset from the axis of the shaft, an elongate strut, a bearing sleeve on one end of the strut and slidably receiving the lobe, a supporting wheel at the other end of the strut, a longitudinally outwardly opening notch at each end of the carrier, a pin on the strut to engage in the notch at one or the other end of the carrier, and means to secure the carrier to an object to be supported, said pin being shifted into and out of locked engagement in the notch to which it is related by rotation of the lobe and resulting axial longitudinal shifting of the strut relative to the carrier.

3. A retractable wheel support of the character referred to including, an elongate, vertically disposed carrier with laterally spaced side walls, means to secure the carrier to an object to be supported, an elongate shaft extending between and rotatably carried by the side walls of the carrier intermediate the ends thereof, a cylindrical lobe on the shaft between the side walls, the central axis of the lobe being offset from the axis of the shaft, an elongate strut having an inner end portion slidably engaged between the side walls of the carrier and an outer end portion projecting from the carrier, a bearing sleeve at the inner end of the strut rotatably receiving the lobe, a wheel rotatably supported at the outer end of the strut, longitudinally outwardly opening notches in the upper and lower ends of the side walls of the carrier, laterally outwardly projecting pins on the strut and an operating lever fixed to one end of the shaft to rotate the shaft and the lobe and to thereby shift the pins on the strut into and out of locked engagement in the notches in one or the other end of the carrier.

4. A retractable support including, an elongate, vertically disposed carrier having a flat, vertically disposed front wall and vertically disposed, rearwardly projecting, laterally spaced side walls, a pair of axially aligned openings in the side walls intermediate their ends, and longitudinally outwardly opening pin receiving notches in the upper and lower ends of the side walls, a shaft rotatably engaged through the openings in the side wall, a cylindrical lobe keyed to the shaft between the side walls and having its central axis offset from the axis of the shaft, an operating lever at one end of the shaft at the outer side of the adjacent side wall, and adapted to facilitate rotating the shaft and the lobe, a bearing sleeve rotatably carried by the lobe, an elongate strut fixed to the bearing sleeve to project therefrom and adapted to be shifted from an up position where it projects upwardly between the side walls of the carrier and a down position where it projects downwardly from between the said side walls, a pin carried by the strut at a point spaced from the bearing sleeve to project from the opposite sides of the strut in locked position in the notches in one end of the carrier when the central axis of the lobe occurs at the opposite side of the axis of the shaft from the pin, and to be clear of the notches when the axis of the lobe occurs at the same side of the axis of the shaft as the pin, and means to secure the front wall of the carrier to an object to be supported.

5. A retractable wheel support including, an elongate, vertically disposed carrier having a flat, vertically disposed front wall and vertically disposed, rearwardly projecting, laterally spaced side walls, a pair of axially aligned openings in the side walls intermediate their ends, and longitudinally outwardly opening pin receiving notches in the upper and lower ends of the side walls, a shaft rotatably engaged through the openings in the side walls, a cylindrical lobe keyed to the shaft between the side walls and having its central axis offset from the axis of the shaft, an operating lever at one end of the shaft at the outer side of the adjacent side wall, and adapted to facilitate rotating the shaft and the lobe, a bearing sleeve rotatably carried by the lobe, an elongate strut fixed to the bearing sleeve to project therefrom and adapted to be shifted from an up position where it projects upwardly between the side walls of the carrier and a down position where it projects downwardly from between the said side walls, a pin carried by the strut at a point spaced from the bearing sleeve to project from the opposite sides of the strut and adapted to occur in locked position in the notches in one end of the carrier when the central axis of the lobe occurs at the opposite side of the axis of the shaft from the pin, and to be clear of the notches when the axis of the lobe occurs at the same side of the axis of the shaft as the pin, means to secure the front wall of the carrier to an object to be supported, and a supporting wheel rotatably secured to the end of the strut remote from the bearing sleeve.

6. In combination, a boat having a top, bottom, sides and a transom, a retractable wheel support for the boat including, an elongate, vertically disposed carrier fixed to the transom of the boat, a shaft rotatably supported by the carrier intermediate its ends, a cylindrical lobe on the shaft, an elongate strut having a bearing sleeve at one end rotatably receiving the lobe, a pin projecting from the strut at a point spaced from the bearing sleeve, a longitudinally outwardly opening, pin receiving notch at each end of the carrier, said strut being shiftable from a down position where it projects downwardly from the carrier to an up position where it projects upwardly from the carrier, said pin being shiftable into and out of locked engagement with the notch in one end or the other of the carrier by rotation of the shaft and lobe, when the strut is in either its up or down position, and a wheel on the end of the strut remote from the bearing sleeve and adapted to occur below the bottom of the boat when the strut is in the down position and to occur above the top of the boat when the strut is in the up position.

7. In combination, a boat having a top, bottom, sides and a transom, a retractable wheel support for the boat including, an elongate, vertically disposed carrier with laterally spaced side walls fixed to the transom of the boat, an elongate shaft extending between and rotatably carried by the side walls, an operating lever fixed to one end of the shaft to rotate the shaft relative to the carrier, a cylindrical lobe carried by the shaft between the side walls of the carrier which its central axis offset from the axis of the shaft, an elongate strut, a bearing sleeve on one end of the strut and slidably receiving the lobe, a supporting wheel at the other end of the strut, a longitudinally outwardly opening notch at each end of the carrier, a pin on the strut to engage in the notch at one or the other end of the carrier and means to secure the carrier to an object to be supported, said pin being shifted into and out of locked engagement in the notch to which it is related by rotation of the lobe, said wheel occurring below the bottom of the boat when the strut projects downwardly from the carrier and occurring above the top of the boat when the strut projects upwardly from the carrier.

8. In combination, a boat having a top, bottom, sides and a vertically disposed rear transom, a retractable wheel support for the boat including an elongate, vertically disposed carrier with a front wall fixed to the transom and vertically disposed, rearwardly projecting, laterally spaced side walls, a pair of axially aligned openings in the side walls intermediate their ends, and longitudinally outwardly opening pin receiving notches in the upper and lower ends of the side walls, a shaft rotatably engaged through the openings in the side walls, a cylindrical lobe keyed to the shaft between the side walls and having its central axis offset from the axis of the shaft, an operating lever at one end of the shaft at the outer side of the adjacent side walls, and adapted to facilitate rotating the shaft and the lobe, a bearing sleeve rotatably carried by the lobe, an elongate strut fixed to the bearing sleeve to project therefrom and adapted to be shifted from an up position where it projects upwardly from between the side walls of the carrier and a down position where it projects downwardly from between the said side walls, a pin carried by the strut at a point spaced from the bearing sleeve to project from the opposite sides of the strut and adapted to occur in locked position in the notches in one end of the carrier when the central axis of the lobe occurs at the opposite side of the axis of the shaft from the pin, and to be clear of the notches when the axis of the lobe occurs at the same side of the axis of the shaft as the pin, means to secure the front wall of the carrier to said transom, and a supporting wheel rotatably secured to the end of the strut remote from the bearing sleeve.

9. In combination, a boat having a top, bottom, sides and a vertically disposed rear transom, a retractable wheel support for the boat including an elongate, vertically disposed carrier with a front wall fixed to the transom and vertically disposed, rearwardly projecting, laterally spaced side walls, a pair of axially aligned openings in the side walls intermediate their ends, and longitudinally outwardly opening pin receiving notches in the upper and lower ends of the side walls, a shaft rotatably engaged through the openings in the side walls, a cylindrical lobe keyed to the shaft to occur between the side walls and having its central axis offset from the axis of the shaft, an operating lever at one end of the shaft at the outer side of the adjacent side walls, and adapted to facilitate rotating the shaft and the lobe, a bearing sleeve rotatably carried by the lobe, an elongate strut fixed to the bearing sleeve to project therefrom and adapted to be shifted from an up position where it projects upwardly from between the side walls of the carrier and a down position where it projects downwardly from between the said side walls, a pin carried by the strut at a point spaced from the bearing sleeve to project from the opposite sides of the strut and adapted to occur in locked position in the notches in one end of the carrier when the central axis of the lobe occurs at the opposite side of the axis of the shaft from the pin, and to be clear of the notches when the axis of the lobe occurs at the same side of the axis of the shaft as the pin, means to secure the front wall of the carrier to said transom, and a supporting wheel rotatably secured to the end of the strut remote from the bearing sleeve, the wheel occurring below the bottom of the boat when the strut is in the down position.

10. In combination, a boat having a top, bottom, sides and a vertically disposed rear transom, a retractable wheel support for the boat including an elongate, vertically disposed carrier with a front wall fixed to the transom and vertically disposed, rearwardly projecting, laterally spaced side walls, a pair of axially aligned openings in the side walls intermediate their ends, and longitudinally outwardly opening pin receiving notches in the upper and lower ends of the side walls, a shaft rotatably engaged through the openings in the side walls, a cylindrical lobe keyed to the shaft between the side walls and having its central axis offset from the axis of the shaft, an operating lever at one end of the shaft at the outer side of the adjacent side walls, and adapted to facilitate rotating the shaft and the lobe, a bearing sleeve rotatably carried by the lobe, an elongate strut fixed to the bearing sleeve to project therefrom and adapted to be shifted from an up position where it projects upwardly from between the side walls of the carrier and a down position where it projects downwardly from between the said side walls, a pin carried by the strut at a point spaced from the bearing sleeve to project from the opposite sides of the strut and adapted to occur in locked position in the notches in one end of the carrier when the central axis of the lobe occurs at the opposite side of the axis of the shaft from the pin, and to be clear of the notches when the axis of the lobe occurs at the said side of the axis of the shaft as the pin, means to secure the front wall of the carrier to said transom, and a supporting wheel rotatably secured to the end of the strut remote from the bearing sleeve, the end portion of the strut remote from the carrier being curved so that when the strut is in its down position the wheel occurs below the bottom of the boat and forward of the transom and so that when the strut is in its up position, it occurs above the bottom plane of the boat and rearward of the transom.

11. In combination, a boat having a top, bottom, sides and a vertically disposed rear transom, an outboard motor mounted centrally of the transom and projecting above and below the top and bottom of the boat and projecting rearwardly from the transom, a pair of laterally spaced, retractable wheel supports for the boat at opposite sides of the motor and each including, an elongate, vertically disposed carrier with a front wall fixed to the transom and vertically disposed, rearwardly projecting, laterally spaced side walls, a pair of axially aligned openings in the side walls intermediate their ends, and longitudinally outwardly opening, pin receiving notches in the upper and lower ends of the side walls, a shaft rotatably engaged through the openings in the side walls, a cylindrical lobe keyed to the shaft between the side walls and having its central axis offset from the axis of the shaft, an operating lever at one end of the shaft at the outer side of the adjacent side walls, and adapted to facilitate rotating the shaft and the lobe, a bearing sleeve rotatably carried by the lobe, an elongate strut fixed to the bearing sleeve to project therefrom and adapted to be shifted from an up position where it projects upwardly from between the side walls of the carrier and a down position where it projects downwardly from between the said side walls, a pin carried by the strut at a point spaced from the bearing sleeve to project from the opposite sides of the strut and adapted to occur in locked position in the notches in one end of the carrier when the central axis of the lobe occurs at the opposite sides of the axis of the shaft from the pin, and to be clear of the notches when the axis of the lobe occurs at the same side of the axis of the shaft as the pin, means to secure the front wall of the carrier to said transom, and a supporting wheel rotatably secured to the end of the strut remote from the bearing sleeve.

12. In combination, a boat having a top, bottom, sides and a vertically disposed rear transom, an outboard motor mounted centrally of the transom and projecting above and below the top and bottom of the boat and projecting rearwardly from the transom, a pair of laterally spaced, retractable wheel supports for the boat at opposite sides of the motor and each including, an elongate, vertically disposed carrier with a front wall fixed to the transom and vertically disposed, rearwardly projecting, laterally spaced side walls, a pair of axially aligned openings in the side walls intermediate their ends, and longitudinally outwardly opening, pin receiving notches in the upper and lower ends of the side walls, a shaft rotatably engaged through the openings in the side walls, a cylindrical lobe keyed to the shaft between the side walls and having its central axis offset from the axis of the shaft, an operating lever at one end of the shaft at the outer side of the adjacent side walls, and adapted to facilitate rotating the shaft and the lobe, a bearing sleeve rotatably carried by the lobe, an elongate strut fixed to the bearing sleeve to project therefrom and adapted to be shifted from an up position where it projects upwardly from between the side walls of the carrier and a down position where it projects downwardly from between the said side walls, a pin carried by the strut at a point spaced from the bearing sleeve to project from the opposite sides of the strut and adapted to occur in locked position in the notches in one end of the carrier when the central axis of the lobe occurs at the opposite sides of the axis of the shaft from the pin, and to be clear of the notches when the axis of the lobe occurs at the same side of the axis of the shaft as the pin, means to secure the front wall of the carrier to said transom, and a supporting wheel rotatably secured to the end of the strut remote from the bearing sleeve, the wheel occurring below the bottom of the boat when the strut is in the down position.

13. In combination, a boat having a top, bottom, sides and a vertically disposed rear transom, an outboard motor mounted centrally of the transom and projecting above and below the top and bottom of the boat and projecting rearwardly from the transom, a pair of laterally spaced retractable wheel supports for the boat at opposite sides of the motor and each including, an elongate, vertically disposed carrier with a front wall fixed to the transom and vertically disposed, rearwardly projecting, laterally spaced side walls, a pair of axially aligned openings in the side walls intermediate their ends, and longitudinally outwardly opening, pin receiving notches in the upper and lower ends of the side walls, a shaft rotatably engaged through the openings in the side walls, a cylindrical lobe keyed to the shaft between the side walls and having its central axis offset from the axis of the shaft, an operating lever at one end of the shaft at the outer side of the adjacent side walls, and adapted to facilitate rotating the shaft and the lobe, a bearing sleeve rotatably carried by the lobe, an elongate strut fixed to the bearing sleeve to project therefrom and adapted to be shifted from an up position where it projects upwardly from between the side walls of the carrier and a down position where it projects downwardly from between the said side walls, a pin carried by the strut at a point spaced from the bearing sleeve to project from the opposite sides of the strut and adapted to occur in locked position in the notches in one end of the carrier when the central axis of the lobe occurs at the opposite sides of the axis of the shaft from the pin, and to be clear of the notches when the axis of the lobe occurs at the same side of the axis of the shaft as the pin, means to secure the front wall of the carrier to said transom, and a supporting wheel rotatably secured to the end of the strut remote from the bearing sleeve, the end portion of the strut remote from the carrier being curved so that when the strut is in the down position the wheel occurs below the bottom of the boat and forward of the transom and so that when the strut is in its up position, it occurs above the bottom plane of the boat and rearward of the transom.

14. In combination, a boat having a top, bottom, sides and a vertically disposed rear transom, an outboard motor mounted centrally of the transom and projecting above and below the top and bottom of the boat and projecting rearwardly from the transom, a pair of laterally spaced, retractable wheel supports for the boat at opposite sides of the motor and each including, an elongate, vertically disposed carrier with a front wall fixed to the transom and vertically disposed, rearwardly projecting, laterally spaced side walls, a pair of axially aligned openings in the side walls intermediate their ends, and longitudinally outwardly opening, pin receiving notches in the upper and lower ends of the side walls, a shaft rotatably engaged through the openings in the side walls, a cylindrical lobe keyed to the shaft between the side walls and having its central axis offset from the axis of the shaft, an operating lever at one end of the shaft at the outer side of the adjacent side walls, and adapted to facilitate rotating the shaft and the lobe, a bearing sleeve rotatably carried by the lobe, an elongate strut fixed to the bearing sleeve to project therefrom and adapted to be shifted from an up position where it projects upwardly from between the side walls of the carrier and a down position where it projects downwardly from between the said side walls, a pin carried by the strut at a point spaced from the bearing sleeve to project from the opposite sides of the strut and adapted to occur in locked position in the notches in one end of the carrier when the central axis of the lobe occurs at the opposite sides of the axis of the shaft from the pin, and to be clear of the notches when the axis of the lobe occurs at the same side of the axis of the shaft as the pin, means to secure the front wall of the carrier to said transom, and a supporting wheel rotatably secured to the end of the strut remote from the bearing sleeve, the end portion of the strut remote from the carrier being curved so that when the strut is in its down position the wheel occurs below and forward of the lowermost portion of the outboard motor and so that when the strut is in its up position the wheels occur above and rearward of the upper and rearmost portions of the outboard motor.

15. A retractable wheel support including, an elongate, vertically disposed carrier with laterally spaced side walls, an elongate shaft extending between and rotatably carried by the side walls intermediate their ends, a cylindrical lobe carried by the shaft between the side walls of the carrier with its central axis offset from the axis of the shaft, an operating lever fixed to one end of the lobe to rotate the shaft relative to the carrier, an elongate strut, a bearing sleeve on one end of the strut and slidably receiving the lobe, a supporting wheel at the other end of the strut, a longitudinally outwardly opening notch at each end of the carrier, a pin on the strut to engage in the notch at one or the other end of the carrier, and means to secure the carrier to an object to be supported, said pin being shifted into and out of locked engagement in the notch to which it is related by rotation of the lobe and resulting shifting of the strut longitudinally of the carrier.

References Cited in the file of this patent

UNITED STATES PATENTS

| | | |
|---|---|---|
| 1,777,886 | Kusterle | Oct. 7, 1930 |
| 2,653,036 | Creel | Sept. 22, 1953 |
| 2,708,146 | Adler | May 10, 1955 |
| 2,863,159 | Bear | Dec. 9, 1958 |
| 2,965,392 | Mitchell | Dec. 20, 1960 |

FOREIGN PATENTS

| | | |
|---|---|---|
| 127,772 | Australia | May 17, 1948 |